United States Patent
Agrawal et al.

(10) Patent No.: US 11,297,599 B2
(45) Date of Patent: Apr. 5, 2022

(54) SIMULTANEOUSLY BROADCASTING ACKNOWLEDGEMENTS OF RECEPTION OF UPLINK WIRELESS COMMUNICATION

(71) Applicant: Skylo Technologies, Inc., San Mateo, CA (US)

(72) Inventors: Meghna Agrawal, Cupertino, CA (US); Andrew Nuttall, Redwood City, CA (US); Vijay Lewis, Wylie, TX (US)

(73) Assignee: Skylo Technologies, Inc., Palo Alto, CA (US)

( * ) Notice: Subject to any disclaimer, the term of this patent is extended or adjusted under 35 U.S.C. 154(b) by 334 days.

(21) Appl. No.: 16/520,515

(22) Filed: Jul. 24, 2019

(65) Prior Publication Data

US 2020/0344720 A1 Oct. 29, 2020

Related U.S. Application Data

(63) Continuation-in-part of application No. 16/396,651, filed on Apr. 27, 2019, now Pat. No. 10,897,305.

(51) Int. Cl.
*H04W 72/00* (2009.01)
*H04L 5/00* (2006.01)
(Continued)

(52) U.S. Cl.
CPC ...... *H04W 72/005* (2013.01); *H04B 7/18513* (2013.01); *H04B 7/18526* (2013.01);
(Continued)

(58) Field of Classification Search
CPC ........... H04W 72/005; H04W 72/0446; H04W 72/0453; H04B 7/18513; H04B 7/18526; H04L 5/0055
See application file for complete search history.

(56) References Cited

U.S. PATENT DOCUMENTS 6,529,731 B2  3/2003  Modzelesky et al.
6,591,084 B1  7/2003  Chuprun et al.
(Continued)

FOREIGN PATENT DOCUMENTS

WO  WO/2001/056204  2/2001

OTHER PUBLICATIONS

Notification of Transmittal of the International Search Report and the Written Opinion of the International Searching Authority, or the Declaration, PCT/US20/40980, dated Oct. 1, 2020.
(Continued)

*Primary Examiner* — Michael J Moore, Jr.
(74) *Attorney, Agent, or Firm* — Brian R. Short

(57) ABSTRACT

Apparatuses, methods, and systems for communicating through a wireless link are disclosed. A method includes scheduling, by a server, communication between a base station and a plurality of hubs, receiving, by the base station, the scheduled communication, providing, to each hub, a data profile that includes a periodicity, an offset, and a carrier frequency based on the scheduled communication, receiving, by the base station, uplink wireless communication from each of the plurality of hubs according to the data profile of each of the hubs and according to the scheduled communication, and simultaneously broadcasting, by the base station, acknowledgements of reception of uplink wireless communication from each of the plurality of hubs.

19 Claims, 13 Drawing Sheets

(51) Int. Cl.
*H04B 7/185* (2006.01)
*H04W 72/04* (2009.01)

(52) U.S. Cl.
CPC ....... *H04L 5/0055* (2013.01); *H04W 72/0446* (2013.01); *H04W 72/0453* (2013.01)

(56) References Cited

U.S. PATENT DOCUMENTS

| | | | |
|---|---|---|---|
| 7,602,743 B2* | 10/2009 | Tang | H04B 7/18517 370/316 |
| 9,455,777 B1 | 9/2016 | Johnson et al. | |
| 9,622,259 B2 | 4/2017 | Johnson et al. | |
| 10,547,374 B1* | 1/2020 | Liu | H04W 52/34 |
| 10,897,305 B2* | 1/2021 | Nuttall | H04W 56/0045 |
| 2002/0010934 A1* | 1/2002 | Matsuda | H04N 21/4722 725/64 |
| 2006/0171418 A1 | 8/2006 | Casini et al. | |
| 2008/0159419 A1* | 7/2008 | Smith | H04W 56/0045 375/260 |
| 2009/0061760 A1* | 3/2009 | Barak | H04H 20/74 455/3.02 |
| 2009/0296629 A1 | 12/2009 | Lincoln | |
| 2013/0121229 A1* | 5/2013 | Vare | H04H 20/67 370/312 |
| 2014/0181288 A1 | 6/2014 | Potkonjak | |
| 2016/0125471 A1 | 5/2016 | Hsu et al. | |
| 2016/0294530 A1* | 10/2016 | Merlin | H04W 72/12 |
| 2017/0085328 A1 | 3/2017 | Dickemann, Jr. et al. | |
| 2018/0152235 A1* | 5/2018 | Smoot | H04B 7/18515 |
| 2018/0359811 A1 | 12/2018 | Verzun et al. | |
| 2018/0376393 A1* | 12/2018 | Wu | H04B 7/18504 |
| 2019/0379448 A1* | 12/2019 | Markovitz | H04B 7/18582 |
| 2020/0119808 A1* | 4/2020 | Parr | H04B 7/2656 |
| 2020/0343967 A1* | 10/2020 | Nuttall | H04L 47/365 |
| 2020/0344720 A1* | 10/2020 | Agrawal | H04L 5/0035 |

OTHER PUBLICATIONS

Notification of Transmittal of the International Search Report and the Written Opinion of the International Searching Authority, or the Declaration, PCT/US20/25399, dated Jun. 22, 2020.

* cited by examiner

```
┌─────────────────────────────────────────────────────────────────────────┐
│ Providing, by each of a plurality of hubs, a unique identifier to a network management element │
│ associated with a base station, wherein the providing includes wirelessly transmitting, by each │
│    of the hubs, the unique identifier to the base station through a wireless satellite link    │
│                                         1110                                                   │
└─────────────────────────────────────────────────────────────────────────┘
                                          │
                                          ▼
┌─────────────────────────────────────────────────────────────────────────┐
│ Receiving through the wireless satellite link, by each hub, one or more data profiles back from │
│ the network management element wherein each of the one or more data profiles correspond with    │
│                each of one or more data sources associated with the hub                         │
│                                         1120                                                   │
└─────────────────────────────────────────────────────────────────────────┘
                                          │
                                          ▼
┌─────────────────────────────────────────────────────────────────────────┐
│       Receiving, by each hub, data from the one or more data sources associated with the hub   │
│                                         1130                                                   │
└─────────────────────────────────────────────────────────────────────────┘
                                          │
                                          ▼
┌─────────────────────────────────────────────────────────────────────────┐
│   Controlling, by each hub, a timing of communication of the data for each of the one or more   │
│  data sources from the hub to the base station through the wireless satellite link based on the data │
│   profile corresponding with the data source, wherein the data profile of each of the data sources │
│   of each of the hubs maintain synchronous timing of the communication of the data of each of   │
│                  the data sources of each of the hubs with respect to each other                │
│                                         1140                                                   │
└─────────────────────────────────────────────────────────────────────────┘
```

SIMULTANEOUSLY BROADCASTING ACKNOWLEDGEMENTS OF RECEPTION OF UPLINK WIRELESS COMMUNICATION

RELATED APPLICATIONS

This patent application is a continuation-in-part (CIP) of U.S. patent application Ser. No. 16/396,651, filed Apr. 27, 2019, titled "Coordinated Access to a Satellite Link using Data Profiles", which is hereby incorporated by reference.

FIELD OF THE DESCRIBED EMBODIMENTS

The described embodiments relate generally to wireless communications. More particularly, the described embodiments relate to systems, methods and apparatuses for simultaneously broadcasting, by the base station, acknowledgements of reception of uplink wireless communication.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for simultaneously broadcasting, by the base station, acknowledgements of reception of uplink wireless communication.

SUMMARY

An embodiment includes a method of communicating through a wireless link. The method includes scheduling, by a server, communication between a base station and a plurality of hubs, receiving, by the base station, the scheduled communication, providing, to each hub, a data profile that includes a periodicity, an offset, and a carrier frequency based on the scheduled communication, receiving, by the base station, uplink wireless communication from each of the plurality of hubs according to the data profile of each of the hubs and according to the scheduled communication, and simultaneously broadcasting, by the base station, acknowledgements of reception of the uplink wireless communication from each of the plurality of hubs, wherein at least one of the plurality of hubs receives and determines whether uplink wireless communication from the at least one of the plurality of hubs was successfully received based at least on utilization of at least the periodicity, the offset, and the carrier frequency of the data profile of the at least one of the plurality of hubs.

Another embodiment includes a wireless system. The system includes a server, the server operative to schedule communication between a base station and a plurality hubs, through wireless links. The base station is operative to receive the scheduled communication, provide to each hub a data profile that includes a periodicity, an offset, and a carrier frequency based on the scheduled communication, receive uplink wireless communication from each of the plurality of hubs according to the data profile of each of the hubs and according to the scheduled communication, and simultaneously broadcast acknowledgements of reception of the uplink wireless communication from each of the plurality of hubs, wherein at least one of the plurality of hubs receives and determines whether uplink wireless communication from the at least one of the plurality of hubs was successfully received based at least on utilization of at least the periodicity, the offset, and the carrier frequency of the data profile of the at least one of the plurality of hubs.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 11 is a flow chart that includes steps of a method of coordinating access of a plurality of devices across a satellite link, according to an embodiment.

DETAILED DESCRIPTION

The embodiments described include methods, apparatuses, and systems for simultaneously broadcasting acknowledgements of reception of the uplink wireless communication. For at least some embodiments, a server schedules communication between a base station and a plurality of hubs. For an embodiment, the base station receives the scheduled communication which the base station can provide to each of the plurality of hubs. Each hub is provided with a data profile that includes a periodicity, an offset, and a carrier frequency based on the scheduled communication. The base station receives uplink wireless communication from each of the plurality of hubs according to the data profile of each of the hubs and according to the scheduled communication. Finally, the base station simultaneously broadcasts acknowledgements of reception of the uplink wireless communication from each of the plurality of hubs. For an embodiment, each hub uses the periodicity, the offset, and the carrier frequency within the data profile to facilitate at least one of the uplink communication and/or the reception of acknowledgement of the uplink communication through reception of the simultaneously broadcast acknowledgements.

Figure 1:
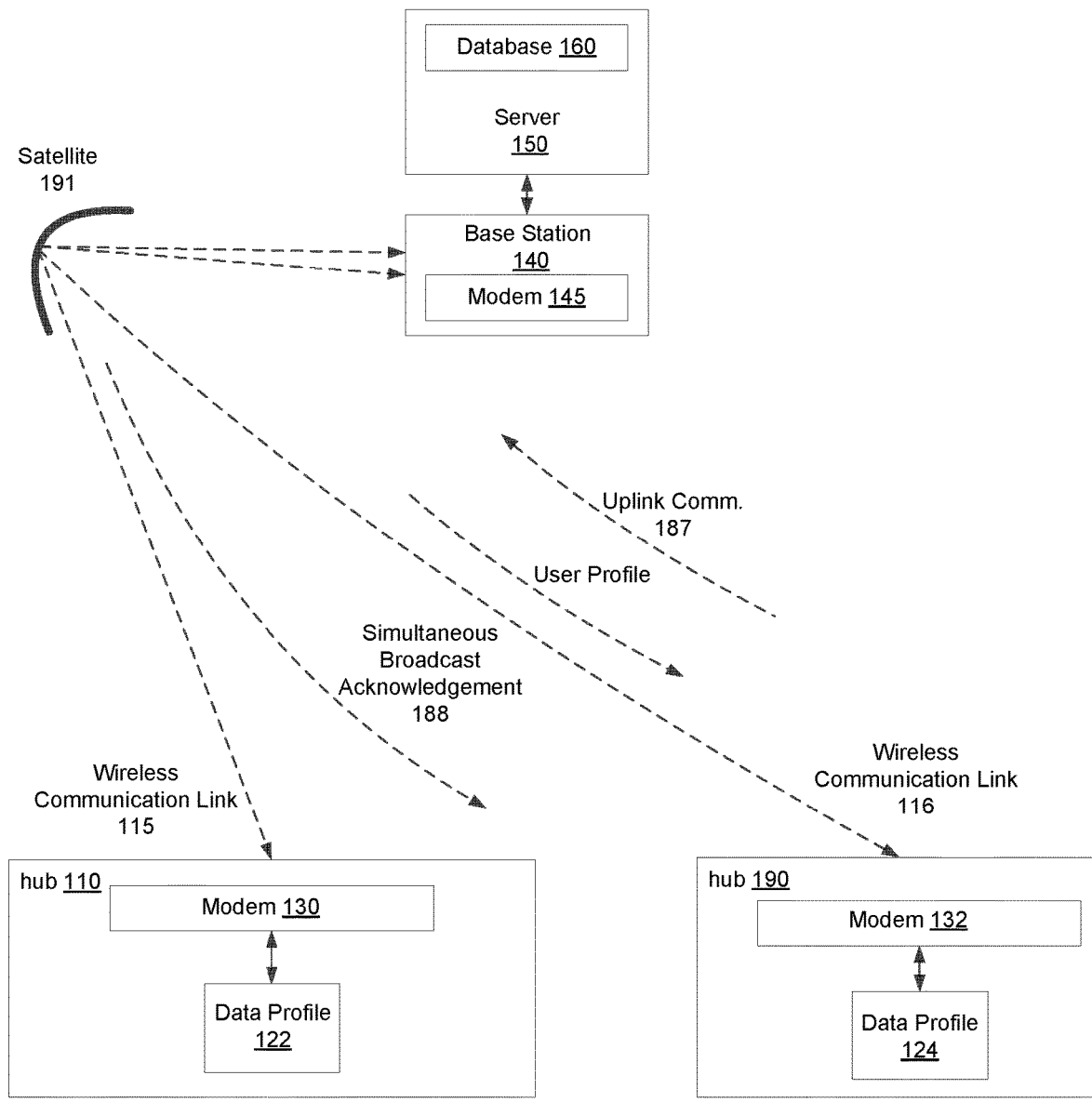
FIG. 1 shows a plurality of hubs that communicate data of data sources through a satellite link to a base station, according to an embodiment.

FIG. 1 shows a base station 140 wirelessly communicating with a plurality of hubs 110, 190, according to an embodiment. For an embodiment, a server 150 operates to generate scheduling of the wireless communication between the base station 140 and the plurality of hubs) 110, 190 through wireless links 115, 116. For an embodiment, the server 150 may access a database 160, aid in generating the scheduled communication, and provide the scheduled communication to the base station 140. For an embodiment, the scheduled communication includes allocating frequency and time slots for both uplink and downlink wireless communication. For an embodiment, the base station 140 includes a modem 145 and the hubs 110, 190 include modems 130, 132, for enabling the wireless communication between the base station 140 and the hubs 110, 190.

For an embodiment, the server 150 additionally generates a data profile 122, 124 for each of the hubs. For example, the server 150 generates the data profile that the base station 140 provides to the hub 190. For an embodiment, the data profile includes a periodicity, an offset, and a carrier frequency based on the scheduled communication. For an embodiment, the hub 190 utilizes the periodicity, the offset, and the carrier frequency of its data profile 124 for determining when and at what carrier frequency to transmit uplink wireless communication 187 to the base station 140.

For an embodiment, the base station 140 then receives uplink wireless communication from each of the plurality of hubs 110, 190 according to the data profile of each of the hubs 110, 190 and according to the scheduled communication. For an embodiment, the hubs 110, 190 use the data profiles 122, 124 for determining when to transmit, and the base station 140 uses the scheduled communication to determine when to receive the uplink wireless communication.

For an embodiment, after the time period of the scheduled communication, the base station 140 simultaneously broadcasts acknowledgements 188 of reception of the uplink wireless communication from each of the plurality of hubs 110, 190. That is, the simultaneously broadcast acknowledgement 188 includes acknowledgments directed to each of the individual hubs 110, 190 and indicates whether the scheduled uplink communication received from each of the individual hubs 110, 190 was successfully received. Each of the individual hubs 110, 190 can determine whether its uplink wireless communication was successfully received based on reception of the broadcast acknowledgement 188. That is, each of the hubs 110, 190 determine whether the uplink wireless communication was successful based on the simultaneously broadcast acknowledgements, wherein reception of the simultaneously broadcast acknowledgements by each hub is facilitated by the data profile of the hub. For an embodiment, the hub utilizes the periodicity, the offset, and the carrier frequency within the data profile to determine or identify acknowledgements of uplink communication of the hub to the base station.

For an embodiment, the broadcast acknowledgement 188 originates at the server 150. For an embodiment, the broadcast acknowledgement 188 originates at the base station 140.

By including the acknowledgments of many hubs within a single broadcast acknowledgement rather than generating a separate transmitted acknowledgment for each individual hub saves wireless communication air-time. This becomes more and more true as the number of hubs increases.

As shown, for an embodiment, the uplink wireless communication is transmitted by plurality of hubs and received by the base station through a satellite wireless link via a satellite 191, and the base station simultaneously broadcasts the acknowledgements through the satellite wireless link.

Figure 2:
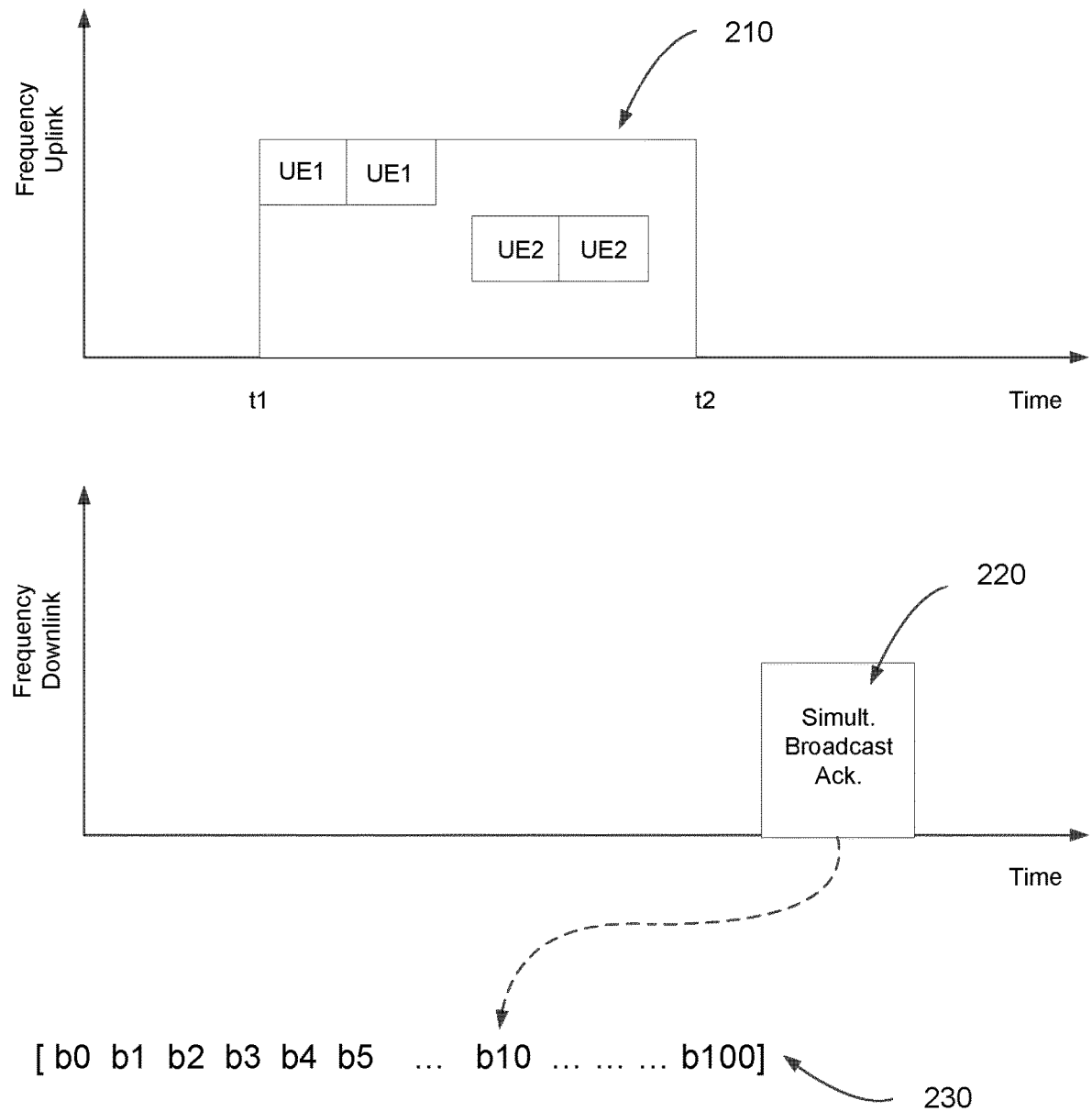
FIG. 2 shows uplink and downlink frames of wireless communication, according to an embodiment.

FIG. 2 shows uplink and downlink frames 210, 220 of wireless communication, according to an embodiment. The scheduled communication includes uplink communication allocations for each of the hubs 110, 190. As shown, the uplink frame includes uplink wireless communication allocations for a hub1 and a hubB2 at different time and frequency slots within the uplink frame 210.

For an embodiment, the data profile for each hub includes at least one time and frequency slot for uplink communication of the hub. For an embodiment, the data profile for the hub further includes at least one time and frequency slot for reception of broadcast acknowledgments the hub. That is, not only does the data profile provide the hub with the scheduled uplink wireless communication, the data profile additionally includes scheduling of the downlink broadcast acknowledgements. For an embodiment, the acknowledgements can be extracted by hub from the simultaneous broadcast acknowledgement 220 by using the schedule (provided as part of user-profile) used by hub for uplink communication.

Further, for an embodiment, the hub determines which of one or more bits of a received broadcast acknowledgement packet within the simultaneous broadcast acknowledgement of the downlink frame 220 includes acknowledgment information of the hub based on the scheduled time and frequency slots for uplink communication of the hub. For example, as shown, a packet 230 within the simultaneous broadcast acknowledgement of the downlink frame 220 includes the acknowledgement information of each of the plurality of hubs. Each hub can determine which bit(s) of the packet 230 within simultaneous broadcast acknowledgement of the downlink frame 220 includes the acknowledgement information direction to the hub based on the information within the data profile of the hub, or based on the time and frequency slot the hub used in its uplink wireless communication. For an embodiment, the location of acknowledgement for uplink communication during a specific time slots-subcarrier within simultaneous broadcast acknowledgement can be determined by user device using the schedule (for example, timeslot and sub-carrier frequency) used for uplink transmission.

As previously described, for an embodiment, the scheduled communication that is provided to the base station includes time slots and carrier frequencies, and includes an allocation of at least some of the time slots and subcarrier frequencies. That is, at least some of the time and frequency slots are allocated by the scheduled communication provided to the base station by the server. For an embodiment, the scheduled communication includes sub-frames. For a specific embodiment, a sub-frame includes 1 millisecond timeslots as specified NB-IOT (Narrow-Band Internet of Things) standards. For an embodiment, the scheduled communication includes user information (such as, user Identity), data transmission mode and connection related information for the user for which timeslots and sub-carrier frequencies (resource units) are allocated.

For at least some embodiment, the base station receives the scheduled communication in the form of allocated time and frequency slots, and the base station further allocates additional time slots and carrier frequencies. For an embodiment, the further allocating includes the receiving, by the base station, subsequent requests and demands that the base station adapts and infills the additional time slots and carrier frequencies. For an embodiment, the base station receives a time period that is allocated to the base station, and the base station then selects time slots and sub-carriers within the time period for the scheduled communication.

For at least some embodiments, the base station receives the uplink communication from the hubs, and collects acknowledgements for scheduled uplink communication in a hyper frame/radio frame/subframe (or a fixed time duration) and sub-carrier frequency range, and creates a broadcast packet (the simultaneously broadcast acknowledgements). For an embodiment, the base station then broadcasts the broadcast/multicast packet (the simultaneously broadcast acknowledgements) at a set time delay from completion of a time window used for collection of acknowledgements of the scheduled uplink communication. This broadcast includes acknowledgement of receiving packets (the uplink communication) successfully in a frequency and time slot within the given time window.

For an embodiment, the data profile of the user device facilitates reception of the simultaneously broadcast acknowledgements through at least an acknowledgement period and an acknowledgement offset included within the data profile of the hub that allows the hub to determine when to receive simultaneously broadcast acknowledgements of uplink wireless communication of the hub.

For an embodiment, each simultaneously broadcast acknowledgement includes acknowledgement information of a plurality of hubs that transmitted uplink wireless communication within a corresponding period of time t2-t1, and frequency (subcarrier) allocation. For an embodiment, this includes timeslots within subcarrier allocations within the t2-t1 time duration, wherein the subcarrier allocation may or may not be continuous within a range of subcarriers, and the time slots may or may not by continuous in time, forming a checkerboard of time slots and subcarrier frequencies within the t2-t1 time duration.

For an embodiment, the simultaneously broadcast acknowledgements include simultaneously multicast acknowledgements, wherein an acknowledgment for each of the user devices within the simultaneously multicast acknowledgements include a code that a corresponding set of hubs can decode. For an embodiment, hubs with acknowledgements in simultaneous multicast acknowledgement share a code to decode the simultaneous multicast acknowledgement. For an embodiment, the code for multicast acknowledgements is provided with the data profiles. For an embodiment, the code includes a scrambling code.

For an embodiment, the acknowledgment for each of the hubs within the simultaneously broadcast acknowledgements provides an acknowledgment to the hub for uplink wireless communication within a specified number of time slots and carrier frequencies.

For an embodiment, the data profile includes the periodicity, offset, and carrier frequency for the uplink wireless communication, and an acknowledgement periodicity, and an acknowledgement offset of acknowledgements of the uplink wireless communication within the simultaneously broadcast acknowledgements. For an embodiment, the data profiles also include a transmission mode, which can include RRC (Radio Resource Control) message type and data transmission mode for uplink wireless communication.

Figure 3:
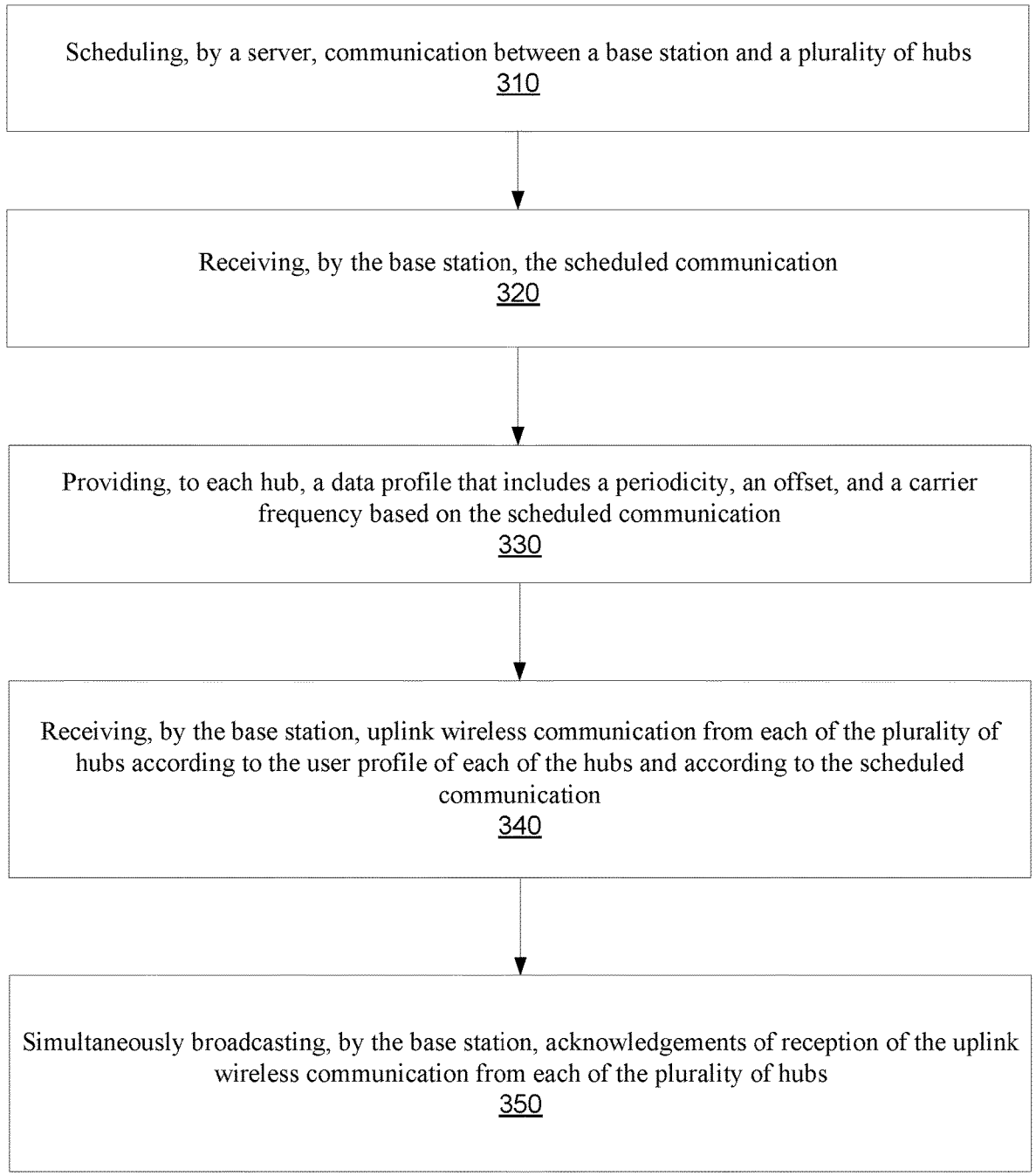
FIG. 3 is a flow chart that includes steps of a method of simultaneously broadcasting, by the base station, acknowledgements of reception of the uplink wireless communication, according to an embodiment.

FIG. 3 is a flow chart that includes steps of a method of simultaneously broadcasting, by the base station, acknowledgements of reception of the uplink wireless communication, according to an embodiment. A first step 310 includes scheduling, by a server, communication between a base station and a plurality of hubs). A second step 320 includes receiving, by the base station, the scheduled communication. A third step 330 includes providing, to each hub, a data profile that includes a periodicity, an offset, and a carrier frequency based on the scheduled communication. A fourth step 340 includes receiving, by the base station, uplink wireless communication from each of the plurality of hubs according to the data profile of each of the hubs and according to the scheduled communication. A fifth step 650 includes simultaneously broadcasting, by the base station, acknowledgements of reception of the uplink wireless communication from each of the plurality of hubs.

As previously described, for an embodiment, the uplink wireless communication is transmitted by the plurality of hubs and received by the base station through a satellite wireless link, and the base station simultaneously broadcasts the acknowledgements through the satellite wireless link.

As previously described, at least some embodiments include determining, by each of the hubs, whether the uplink wireless communication was successful based on the simultaneously broadcast acknowledgements, wherein reception of the simultaneously broadcast acknowledgements by each hub is facilitated by the data profile of the hub. For an embodiment, the data profile includes at least one time and frequency slot for uplink communication of the hub. For an embodiment, the data profile further includes at least one time and frequency slot for reception of broadcast acknowledgments the hub. At least some embodiments further include determining, by the hub, which of one or more bits of a received broadcast acknowledgement packet includes acknowledgment information of the hub based on the scheduled time and frequency slots for uplink communication of the hub.

As previously described, for at least some embodiments the scheduled communication provided to the base station includes time slots and carrier frequencies, and includes an allocation of at least some of the time slots and subcarrier frequencies. At least some embodiments include allocating, by the base station, additional time slots and carrier frequencies. For at least some embodiments the allocating includes the receiving, by the base station, subsequent requests and demands that the base station adapts and infills the additional time slots and carrier frequencies.

As previously described, for at least some embodiments the data profile of the user device facilitates reception of the simultaneously broadcast acknowledgements through at least an acknowledgement period and an acknowledgement offset included within the data profile of the hub that allows the hub to determine when to receive simultaneously broadcast acknowledgements of uplink wireless communication of the hub.

As previously described, for at least some embodiments each simultaneously broadcast acknowledgement includes acknowledgement information of a plurality of hubs that transmitted uplink wireless communication within a corresponding period of time t2–t1, and subcarrier frequencies.

As previously described, for at least some embodiments the simultaneously broadcast acknowledgements include simultaneously multicast acknowledgements, wherein an acknowledgment for each of the user devices within the simultaneously multicast acknowledgements include a code that a corresponding set of hubs can decode.

As previously described, for at least some embodiments an acknowledgment for each of the hubs within the simultaneously broadcast acknowledgements provides an acknowledgment to the hub for uplink wireless communication within a specified number of time slots and carrier frequencies.

As previously described, for at least some embodiments the hub profile includes the periodicity, offset, and carrier frequency for the uplink wireless communication, and an acknowledgement periodicity, and an acknowledgement offset of acknowledgements of the uplink wireless communication within the simultaneously broadcast acknowledgements.

For at least some embodiments, the data profile allows a range of network access techniques to be simultaneously supported on a hub. This allows, for example, a hub that includes a data device such as a temperature sensor and another data device such as a mobile point of sale terminal to employ multiple data reporting techniques. For at least some embodiments, the data profiles allow routing and management of the data on a per packet level rather than on a data device level. That is, for example, the data profile of a data device may dictate that different packets of the data device may be communicated or reported differently. For example, temperature data (packets) may be reported periodically, but if the temperature exceeds a specified level, the temperature data (packets) is reported in real-time.

For an embodiment, channel and transmission characteristics are known a priori for deterministic data types which can be used to significantly reduce the overhead on the network spent on passing this information between a hub and a base station. For at least some embodiments, transmissions by a hub of multiple disparate devices can be coordinated by a network management element via the data profiles and synchronization (that is, synchronization between different data devices) of packets provides traffic spreading and reduces the need for random access and other channel contention resources. For at least some embodiments, hub transmission timing can be coordinated between geographically disparate devices to eliminate the contention for shared network resources only for applicable application types such as periodic or schedule data while preserving the flexibility of real time transmissions.

Figure 4:
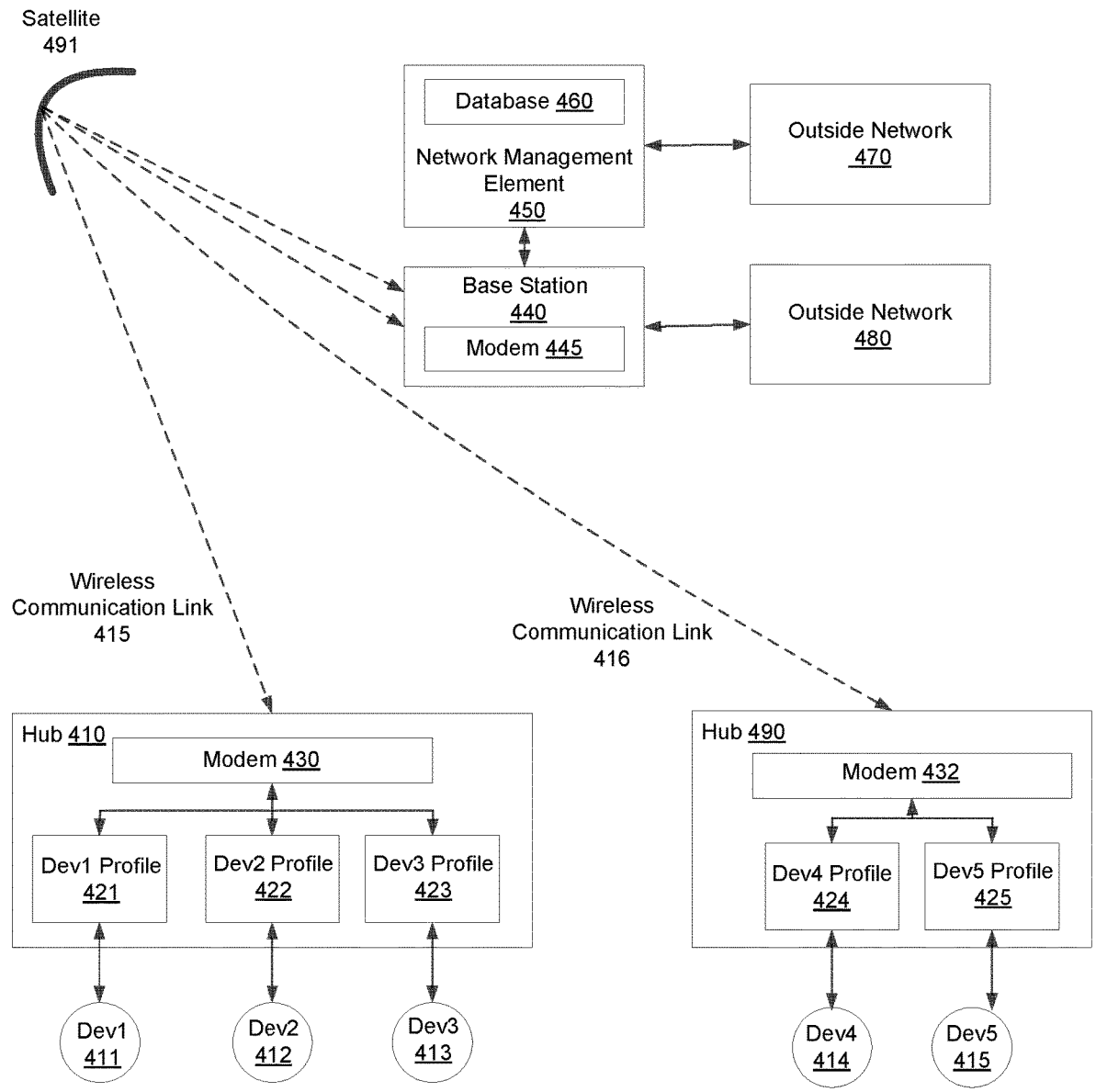
FIG. 4 shows a plurality of hubs that communicate data of data sources through a satellite link to a base station, according to an embodiment.

FIG. 4 shows a plurality of hubs 410, 490 that communicate data of data sources 411, 412, 413, 414, 415 through satellite link(s) 415, 416 to a base station 140, according to an embodiment. As shown, the data sources 411, 412, 413, 414, 415 are connected to the hubs 410, 490. The hubs 410, 490 communicate through modems 430, 432 to a modem 145 of the base station 440 through the wireless satellite links 415, 416. The base station may also communicate with outside networks 470, 480. For an embodiment, the wireless satellite links 415, 416 reflectively pass through a satellite 491.

It is to be understood that the data sources 411, 412, 413, 414, 415 can vary in type, and can each require very different data reporting characteristics. The wireless satellite links 415, 416 links are a limited resource, and the use of this limited resource should be judicious and efficient. In order to efficiently utilize the wireless satellite links 415, 416, each of the data sources 411, 412, 413, 414, 415 are provided with data profiles (shown as Dev profiles as a profile may be allocated for each device) 421, 422, 423, 424, 425 that coordinate the timing (and/or frequency) of reporting (communication by the hubs 410, 490 to the base station 440 through the wireless satellite links 415, 416) of the data provided by the data sources 411, 412, 413, 414, 415.

For an embodiment, a network management element 450 maintains a database 160 in which the data profiles 421, 422, 423, 424, 425 can be stored and maintained. For an embodiment, the network management element 450 is an embodiment of the previously described server 150. For an embodiment, the network management element 450 manages the data profiles 421, 422, 423, 424, 425, wherein the management includes ensuring that synchronization is maintained during the data reporting by the hubs 410, 490 of the data of each of the data sources 411, 412, 413, 414, 415. That is, the data reported by each hub 410, 490 of the data of the data sources 411, 412, 413, 414, 415 maintains synchronization of the data reporting of each of the data sources 411, 412, 413, 414, 415 relative to each other. Again, the network management element 450 ensures this synchronization through management of the data profiles 421, 422, 423, 424, 425. The synchronization between the data sources 411, 412, 413, 414, 415 distributes the timing of the reporting of the data of each of the data sources 411, 412, 413, 414, 415 to prevent the reporting of one device from interfering with the reporting of another device, and provides for efficiency in the data reporting.

Figure 6:
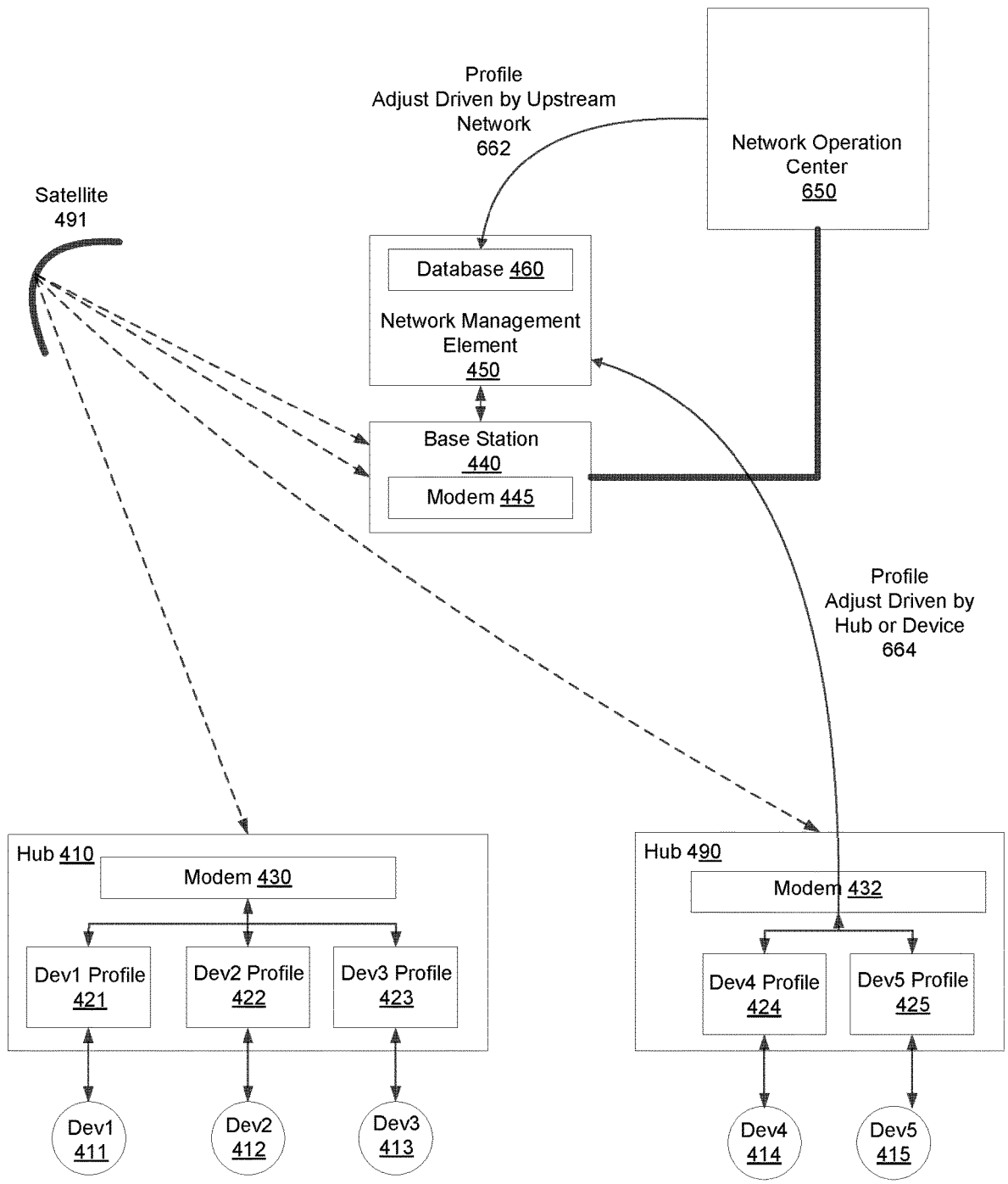
FIG. 6 shows multiple sources for providing updates or feedback of data profiles, according to an embodiment.

For at least some embodiments, the network management element 450 resides in a central network location perhaps collocated with multiple base stations and/or co-located with a network operations center (as shown, for example, in FIG. 6). For an embodiment, the network management element 450 directly communicates with the base station 440 and initiates the transfer of data profiles across the network via the base station 440 to the hubs 410, 490.

For at least some embodiments, data profiles are distributed when new hubs are brought onto the network, when hubs change ownership, or when the hubs are re-provisioned. Other changes to data profile contents outside of these situations are more likely addressed by sync packets (for an embodiment, a sync packet is a packet to update the value of a specific field inside of a data profile, but not necessarily updating the structure of the data profile) where only small changes to profile fields are required.

As described, the data profiles 421, 422, 423, 424, 425 control timing of when the hubs 410, 490 communicate the data of the data sources 411, 412, 413, 414, 415 through wireless satellite links 415, 416 (shared resource). Accordingly, the described embodiments coordinate access to the shared network resource (wireless satellite links 415, 416) to insure optimal usage of the network resource to avoid collisions between packets, the transmission of redundant information, and to reshape undesired traffic profiles.

For at least some embodiments, the data profiles allow for the elimination of redundant data channel setup information which is already contained inside the data profile, which then are no longer needed to be shared upon the initiation of every packet sent across the network. This information may include the transmission size, sub-carrier (frequency) allocation, MCS (modulation and coding scheme) selection, and timing information. The result of this is a reduction in data resources consumed by the network to send a packet of data. In the example of sending a GPS data packet containing x, y, z, and time, the amount of redundant channel setup information is 8× larger than the actual GPS data packet of interest, resulting in a very inefficient network for large volumes of narrowband traffic. Additionally, in the realm of satellite communications, the elimination of unnecessary channel setup messages reduces the latency between the initiation of sending, for example, a GPS packet across the network and actually receiving that packet by roughly half. For example, a normally 3 second latency can be reduced to as low as 0.25 seconds.

While FIG. 4 shows each hub as including more than one data source, it is to be understood that each hub may include a single data source. Further, the data of a single data source may be treated differently based on the profile. That is, different data packets of the single data source may be reported, or communicated differently based on the profile of the data device. For example, some data of the data source may be reported or communicated periodically, whereas different data of the data source may be reported or communicated in real time. For an embodiment, characteristics or properties of the data determine or influence the timing of the communication of the data from the hub of the data source.

Further, while FIG. 4 shows the hubs and the data sources possibly being separate physical devices, it is to be understood that the hub and one or more data devices may actually be a single physical device.

Figure 5:
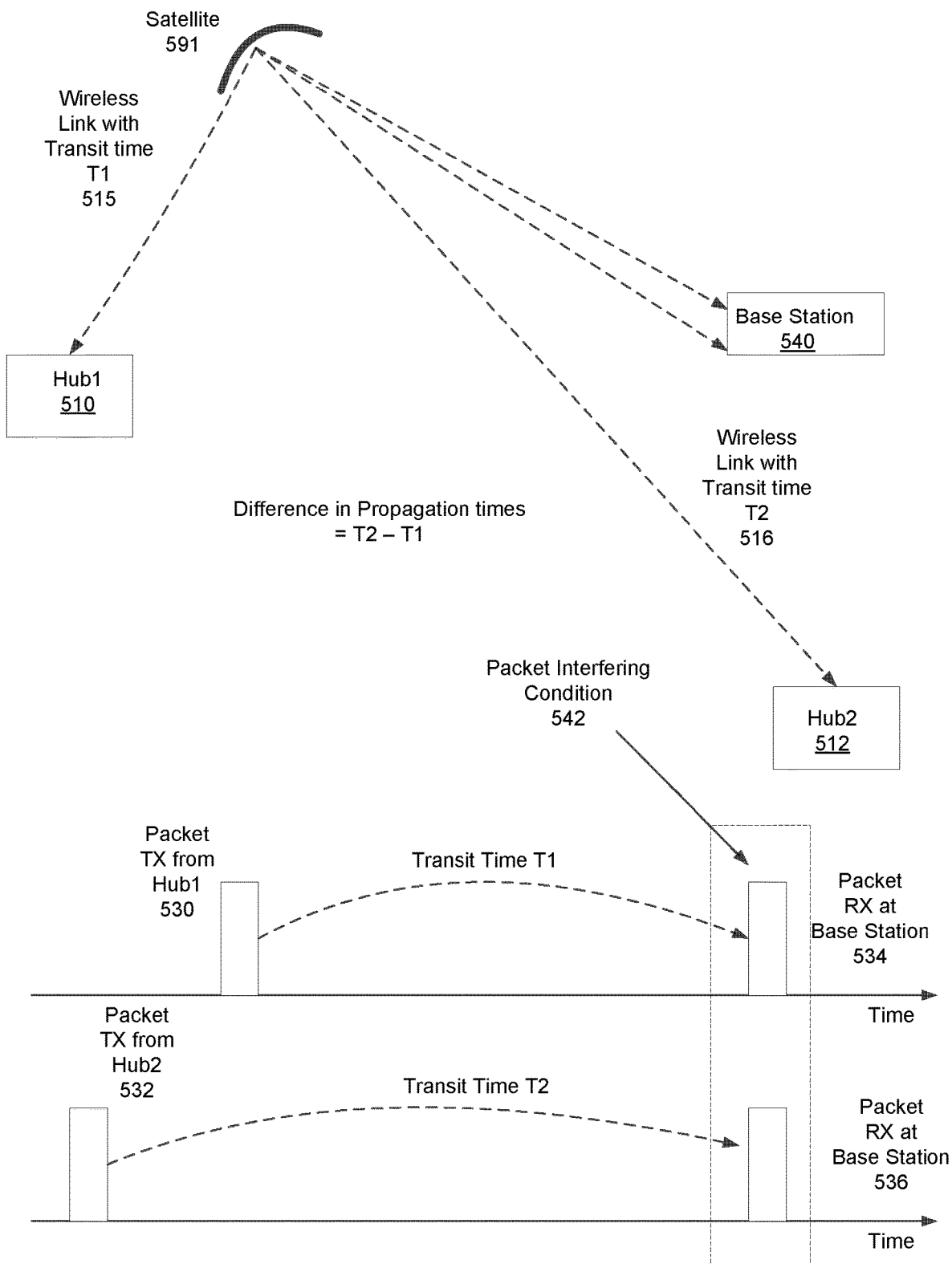
FIG. 5 shows packet interference due to variations in propagation time between the base station and multiple different hubs, according to an embodiment.

FIG. 5 shows packet interference due to variations in propagation time between the base station 540 and multiple different hubs 510, 512, according to an embodiment. As shown, a first hub (Hub 1) 510 has a transit time of wireless communication (link 515) between the first hub (Hub 1) 510 and a satellite 590 of T1. Further, as a second hub (Hub 2) 512 has a transit time of wireless communication (link 516) between the second hub (Hub 2) 512 and the satellite 590 of T2. The variations of the transmit times between different hubs can be large due to the potentially large wireless coverage footprint of the satellite 591.

For at least some embodiments, transmission delay of wireless communication between hubs 510, 512 and the base station 540 includes the summation of at least two components, a course delay and a fine delay. The course delay consists of the minimum delay seen by all hubs communicating to a single base station. Each base station therefore has a single course delay associated with the base station. For an embodiment, the fine delay is the addition of a delay variance across a large geography served by a base station. Therefore, the fine delay is defined on a per hub basis.

For an embodiment, the course delay is transmitted to the hubs 510, 512 and stored in the data profile from the network management element via the base station 540. For an embodiment, the fine delay is similarly transmitted across the network, or it may be independently inferred based upon hub location.

An interference condition can result due to the potentially varying propagation times between the hubs 510, 512 and the base station 540 through the wireless satellite links. For example, as additionally shown in FIG. 2, a packet 530 transmitted from the first hub (Hub 1) 510 to the base station 540 has the first transmit time T1 to the satellite 591. Further, as additionally shown in FIG. 5, a packet 532 transmitted from the second hub (Hub 2) 512 to the base station 540 has the second transmit time T2 to the satellite 591. Accordingly, a packet interfering condition 542 can result when a packet 534 received at the base station 540 from the first hub (Hub 1) 510 is received at the same time that a packet 536 received at the base station 540 from the second hub (Hub 2) 512 is received.

To mitigate the packet interference condition shown in FIG. 5, for at least some embodiments, the profile for each device is adjusted based at least in part on a location of the device, wherein the profile adjustment mitigates differences in propagation time of communication propagating from each hub to the base station. That is, for example, a GPS (global positioning sensor) device of the hub provides the location of the hub. The hub can then adjust the profiles of the data devices associated with the hub based on the location of the hub to reduce the possibility of packet interference due to data reporting by other hubs of data from other date devices.

While this functionality is described using location data, other embodiments to determine the fine propagation delay include timing of preamble positions inside a random access window, signal strength detection, or general timing of sync signals The data profiles of the data source may initially be selected to synchronize the data reporting. However, due to the differences in propagation through wireless links to the base station, the described interference condition can occur. As described, for an embodiment, the hub reporting the data of the data devices can adjust the profiles to account for the differences in propagation delay. For an embodiment, the differences in the propagation delay can be accounted for by the GPS locations of multiple hubs. The data profiles can then be adjusted to account for the differences in wireless transmission propagation delay between reporting hubs. For an embodiment, the propagation time is determined by a time-of-flight of communication between the hub 510 and the base station 540. The differences in the propagation delays can then be accounted for in the data profiles to mitigate interferences between reporting hubs.

FIG. 6 shows multiple sources for providing updates or feedback of data profiles, according to an embodiment. As described, for an embodiment, the network management element manages the data profiles 421, 422, 423, 424, 425 of the data devices 411, 412, 413, 414, 415. At least some embodiments include adjusting the data profile. At least one embodiment includes the data profile adjustment 664 by sourced by a downstream device, such as, one or more of the hubs 410, 490. At least one other embodiment includes the data profile adjustment 662 being sourced by, for example, a network operation center 650.

As stated, for at least some embodiments, the data profiles are adaptively updated based on a top down feedback from the network operation center 650 or the network management element 450. For an embodiment, this includes rebalancing preamble codes assigned to different data devices to smooth RACH (random access channel) profiles, which is triggered, for example, by the detection of excess (greater than a threshold amount) collisions between RACH packets. For an embodiment, the rebalancing includes assigning to the offending devices disparate orthogonal preamble codes to mitigate the collisions. For an embodiment, this includes adjusting timing offsets (adjusting the timing offset includes adjusting the relative timing of periodic reporting) to smooth network traffic congestion and maintain network utilization for periodic data below X %, by measuring allocated versus free network resource units. For an embodiment, this includes updating data profiles when changing an application of a data device, triggered by user/owner operator intervention, for example, via a web console. For an embodiment, this includes updating the course round trip delay timing, triggered, for example, by a new hub registration on a base station.

As stated, for at least some embodiments, the data profiles are adaptively updated based on a bottom up feedback from the hubs 410, 490 or the data sources 411, 412, 413, 414, 415. For an embodiment, this includes the previously described fine round-trip timing delay, constantly updated within the data profiles based upon GPS coordinates of the hubs 410, 490. For an embodiment, this includes the data profile of a data device being updated by a hub through a communication link to the hub. For example, a user/operator may proactively update a profile through the hub by connecting via wireless phone to the hub. This can be useful, for example, when the hub is located in a remote location that is not serviced by a cellular network, and therefore, a user/operator has no way of connecting to the network operation center 650 or the network management element 450 without the wireless satellite connection provided by the hub. The only way for the user/operator to update one or more of the data profiles is through the bottom up feedback provided by the hub.

Figure 7:
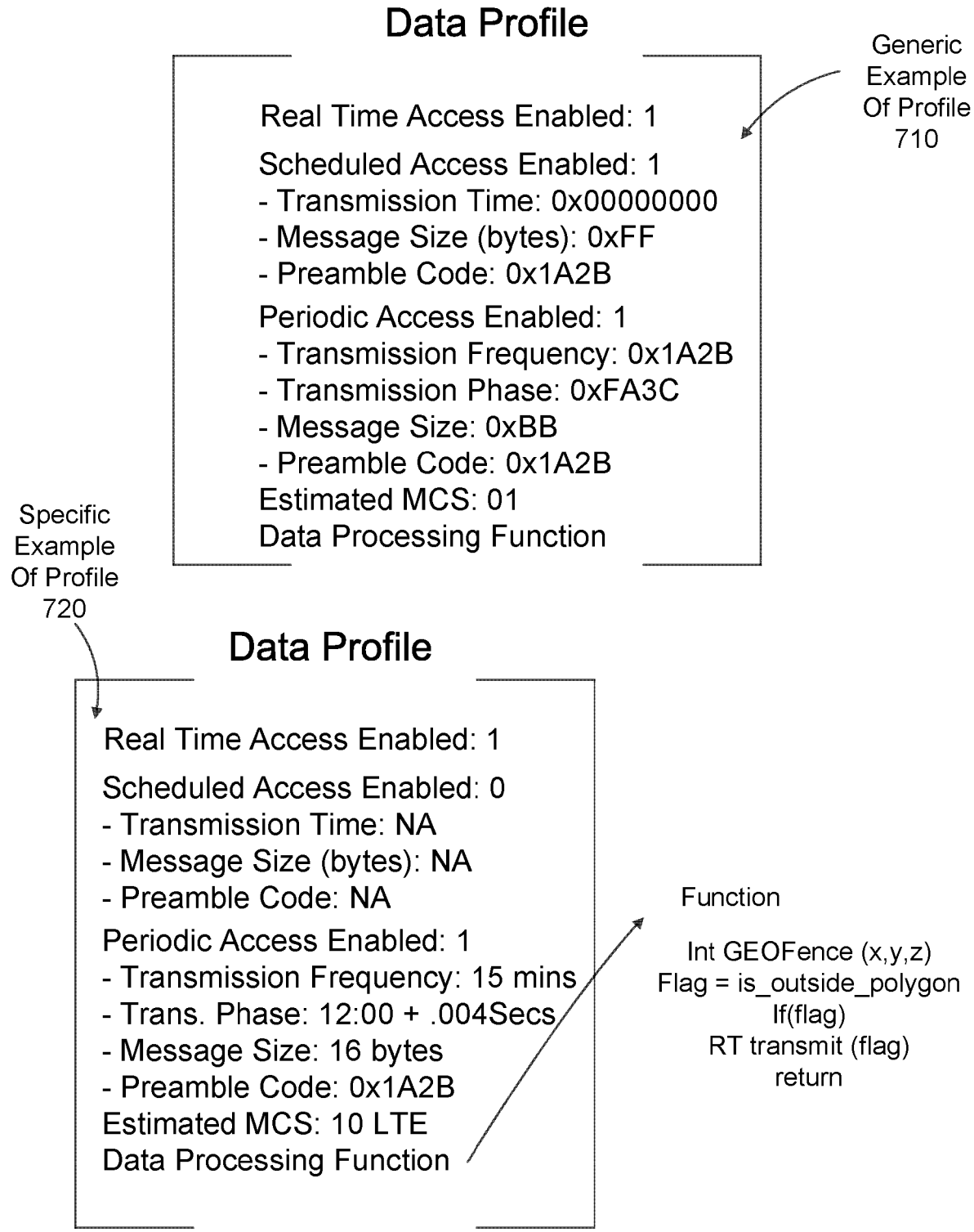
FIG. 7 shows data profiles, according to an embodiment.

FIG. 7 shows data profiles, according to an embodiment. The data profiles provide coordination of the communication of the data of the data devices over the shared wireless satellite links. The communication can include one or more of real time data reporting, scheduled data reporting, and/or periodic data reporting. The data profile for a given data device provides the hub associated with the data device the ability to control a timing of communication of the data for each of the one or more data sources from the hub to a base station through the wireless satellite link. The controlled timing provides for synchronization of the communication of the data with respect to the communication of data of other data sources of both the same hub, and for one or more different hubs. For an embodiment, the data profile additionally provides the hub with a frequency allocation for the communication of the data of the data source.

An exemplary generic data profile 710 of FIG. 7 includes enablement of real time access or real time reporting of the data of the data device, enablement of scheduled access or scheduled reporting of the data of the data device, and enablement of periodic access or periodic reporting of the data of the data device. Further, for an embodiment, the data profile also includes an estimated MCS (modulation and coding scheme). Further, for an embodiment, the data profile also includes a data processing function.

A specific example of a data profile 720 provides for reporting of the location of a data device. This could be, for example, the reporting of data of a data device associated with a vehicle. For this embodiment, both the real time data reporting and the periodic data reporting are enabled, but the scheduled reporting is not enabled. Specifically, the periodic reporting is specified to report once every 15 minutes, beginning at 12:00 (noon). Further, the reporting packet includes a message size of 16 bytes, wherein the preamble codes and the MCS are specified. The data profile 720 includes a specific data processing function. The exemplary function includes determining whether the data device (and therefore, the vehicle associated with the data device) is within a geographical fence. While the data device is within the geographical fence, the data device follows the periodic reporting schedule as specified by the data profile. If the data device is detected to leave an area specified by the geographical fence, the real time reporting flag is triggered, and the hub of the data device performs real time communication with the base station that includes, for example, the location of the data device as detected outside of the geographical fence.

Figure 8:
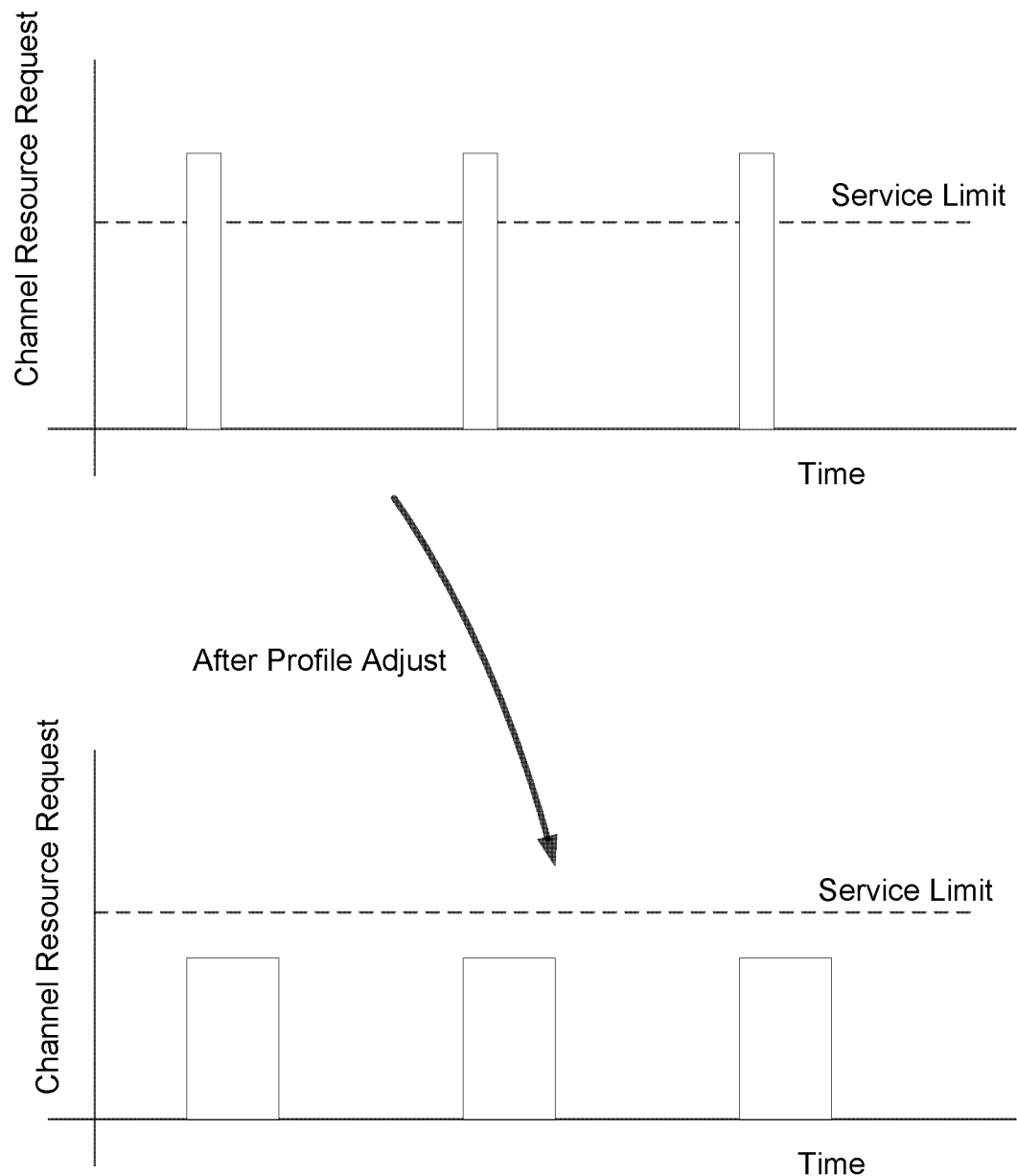
FIG. 8 shows results of data smoothing due to data source profile adjustment, according to an embodiment.

FIG. 8 shows results of data smoothing due to data source profile adjustment, according to an embodiment. As shown in FIG. 8, the data profile can be used to smooth the communication of data of a data source from a hub of the data source to a base station. As shown, before selecting and/or adjusting the data profile, the channel resource request of a particular data device may exceed the resources available (service limit) through the wireless satellite link. However, after selecting and/or adjusting the data profile, the timing of the communication can be selected to smooth the data reporting which does not exceed the service limit of the wireless satellite link.

For at least some embodiments, data traffic of reporting data devices is smoothed to yield channel resource requests to below a service limit threshold (shown as the service limit in FIG. 5) by adjusting a phase offset with the data profile of periodic reporting of data of one or more data devices. As previously stated, the adjusting the phase offset includes adjusting a relative timing of the reporting of periodic data. For an embodiment, the phase offsets of the data profiles of different data devices are spread over wider widows of time. Inferior implementations may select convenient times, such as, on the hour, or on the half hour. However, the described embodiments include adjustments of the phase offset of different devices which provides for the smoothing of the data traffic.

For at least some embodiments, data traffic of reporting data devices is smoothed by adjusting for certain applications the periodicity of the data reporting of different data devices. For an embodiment, this includes adjusting the periodicity to reflect current network conditions. As an example, applications of data devices under certain SLAs (service level agreements) may have their periodicity reduced during peak usage hours which may be found, for example, during harvest season, holidays, or other time periods where human/machine interactions increase. Peak usage hours can be identified a priori or can be identified by monitoring traffic conditions over time, and identifying high (greater than a threshold) periods of data traffic.

Figure 9:
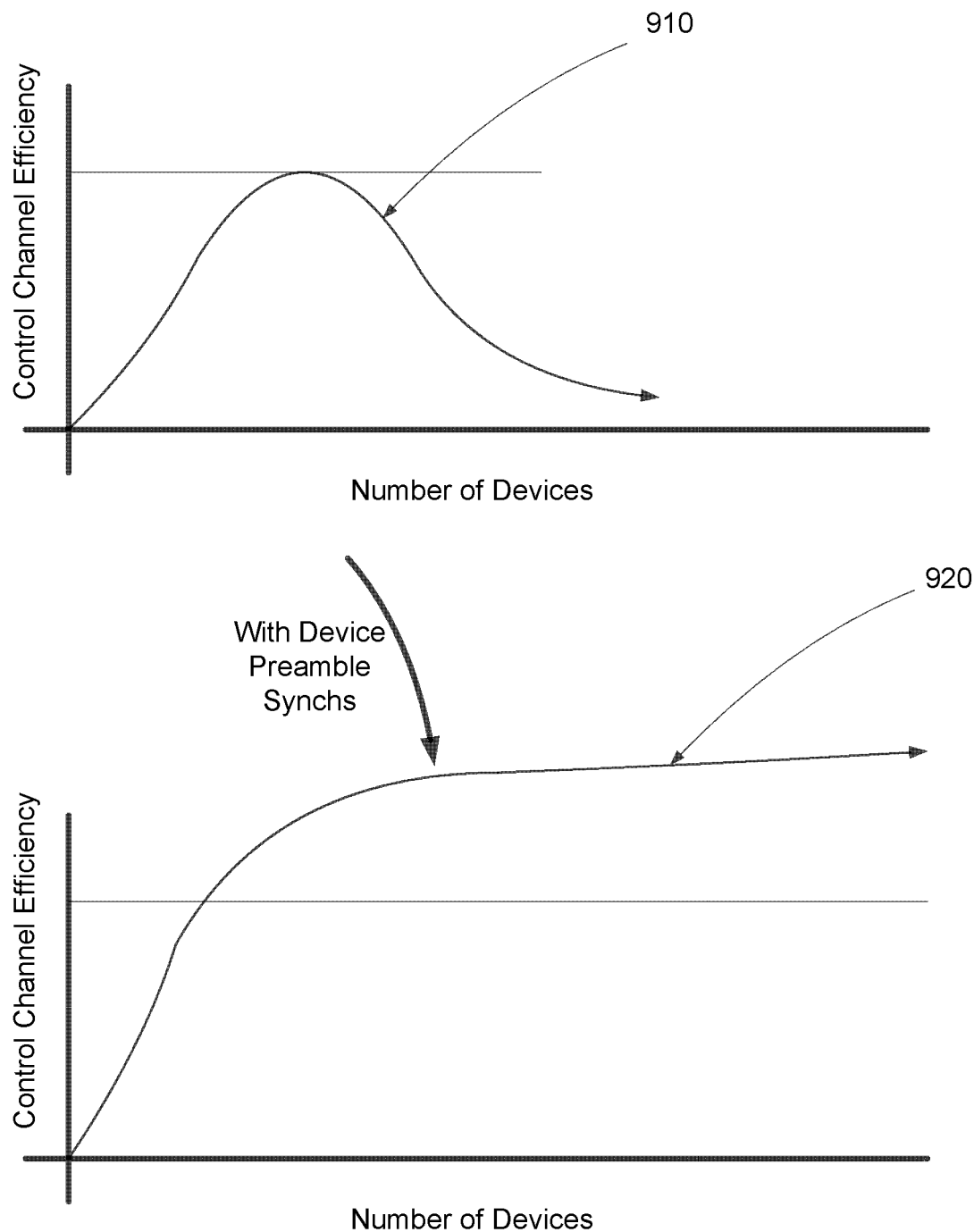
FIG. 9 shows control channel efficiencies and the effects assignments of preamble codes can have on the control channel efficiencies, according to an embodiment.

FIG. 9 shows control channel efficiencies and the effects assignments of preamble codes can have on the control channel efficiencies, according to an embodiment. Before intelligent assignment of preamble codes, the efficiency of a control channel may have the characteristics of curve 910. That is, the efficiency of the control channel may increase as the number of devices increases. However, at some point, as the number of devices increases, the efficiency levels off, and then greatly decreases with increases in the number of devices.

However, by intelligently selecting preambles for packets of reporting data, the efficiency of the control channel can be improved greatly as shown by curve 920. For example, reporting times of different data devices of different hubs can be monitored over time. Based on the monitoring, preamble codes for different devices can be selected such that devices that typically report at common times have orthogonal codes. The assignment of orthogonal codes reduces the possibility of the packets of these devices from interfering with each other. Further, the timing of the reporting can be adjusted through the data profiles.

For at least some embodiments, the network management element curates meta-data about the data devices and data sources connected to the network through the base stations. For an embodiment, this meta-data includes RACH probability density functions. For an embodiment, these probability density functions are used to optimally assign preamble codes between devices to minimize the infinity norm of the expected value (highest value) of RACH requests of the same preamble code. The RACH probability density functions can be determined by monitoring the activity during specified RACH periods of operation.

Figure 10:
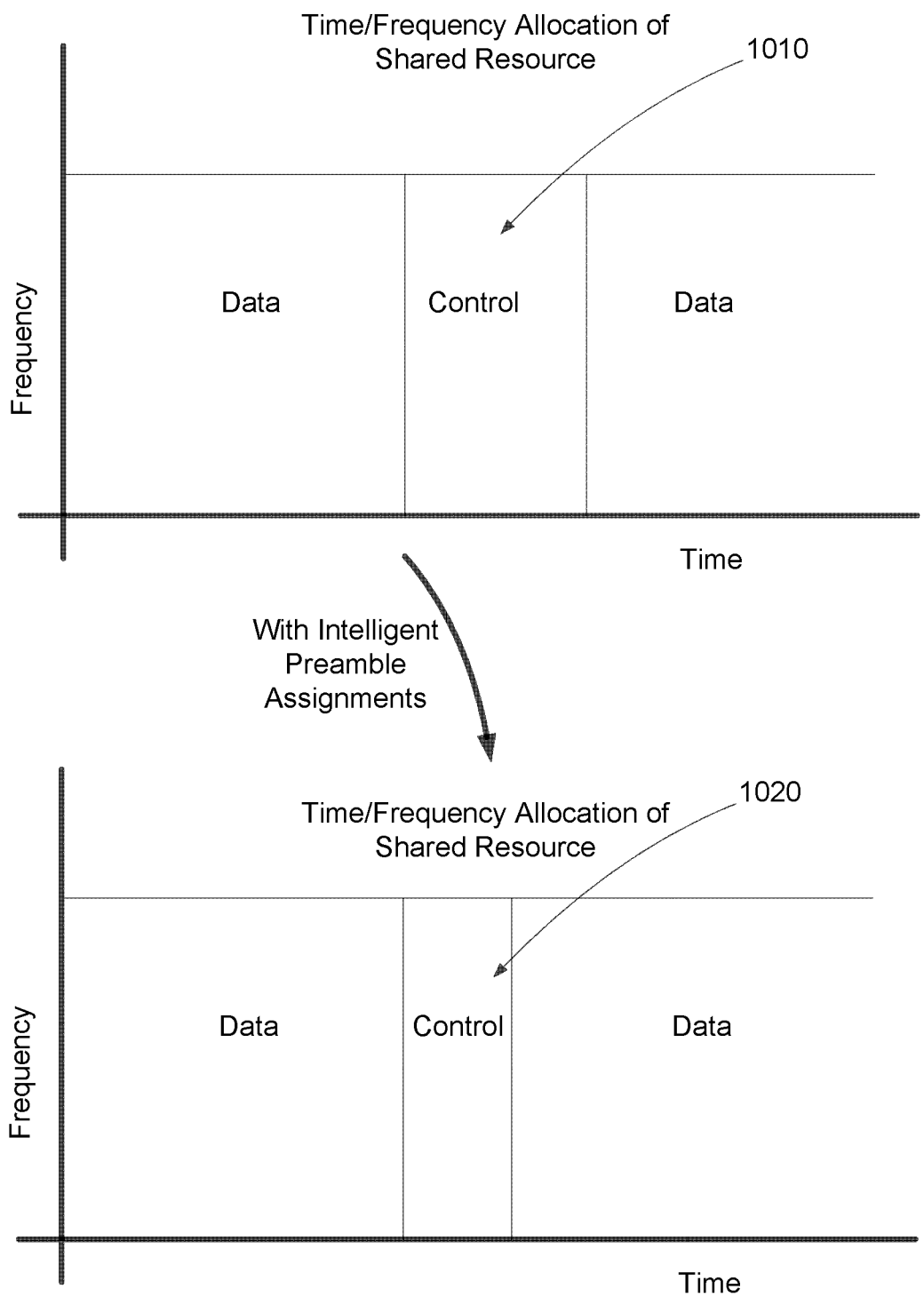
FIG. 10 a dynamic allocation of control channel versus data channel, according to an embodiment.

FIG. 10 shows a dynamic allocation of control channel versus data channel, according to an embodiment. A first control channel allocation 1010 occupying a first amount of frequency and time resources of the wireless link.

The resources allocated to the control channel can be reduced with utilization of intelligent preamble assignments within the data source profiles. A second control channel allocation 1020 occupying a second amount of frequency and time resources of the wireless link which is less than the first control channel allocation 1010.

Without "intelligent" preamble code allocations, maximum efficiency of control channel is 1/e, resulting in excess radio resources (time/frequency) being allocated to RACH (random access channel) which could have otherwise been allocated to data. The size of the RACH control window can also have its requirements reduced through the use of the fine control adjustments to the roundtrip timing when using the location-based embodiment shown in FIG. 2.

FIG. 11 is a flow chart that includes steps of a method of coordinating access of a plurality of devices across a satellite link, according to an embodiment. A first step 1110 includes providing, by each of a plurality of hubs, a unique identifier to a network management element associated with a base station, wherein the providing includes wirelessly transmitting, by each of the hubs, the unique identifier to the base station through a wireless satellite link. A second step 1120 includes receiving through the wireless satellite link, by each hub, one or more data profiles back from the network management element wherein each of the one or more data profiles correspond with one or more data sources associated with the hub. A third step 1130 includes receiving, by each hub, data from the one or more data sources associated with the hub. A fourth step 1140 includes controlling, by each hub, a timing of communication of the data for each of the one or more data sources from the hub to the base station through the wireless satellite link based on the data profile corresponding with the data source, wherein the data profile of each of the data sources of each of the hubs maintain synchronous timing of the communication of the data of each of the data sources of each of the hubs with respect to each other. For at least some embodiments, the network management element further allocates per the data profiles a frequency for the communication between each of the hubs and the base station, for each of the data sources of each of the hubs.

As described, for at least some embodiments, the data profiles control the timing of the reporting of the data of the different data sources to synchronize the data reporting and control (dictate) the radio resource (such as, time and frequency) between the hubs and the base station. For at least some embodiments, the data profile for each data source includes a rule set for the data source, wherein the rule set controls the timing of communication. The rule set of the data profile in contrast to, for example, to a MAC (medium access control) schedule is set and used by the hubs for controlling the communication until the data profile is updated due to a triggering event.

For an embodiment, the network management element communicates a profile adaptor to one or more of the hubs. For an embodiment, this includes the network management element broadcasting rule sets used by the hub to control/process the data profile(s). For an embodiment, when a hub receives the profile adaptor, if QOS of the data profile is less than x then the hub changes, for example, the periodicity of periodic transmissions of a data source for a threshold period of time or until another message (such as, another profile adaptor) with a new rule set is received.

For an embodiment, the rule set includes device dependencies of the data profile. For example, the rule set may include time and location states of the data device dependency of the data profile.

For an embodiment, the hub collects the data of the data devices, but does not transmit the data until the network management element solicits the hub for data transmission. For an embodiment, the hub informs the network management element of restrictions and/or requirements of the hub or the data device associated with the hub. For example, the hub may be specified by the data profile to transmit once a day, but the hub is available to transmit only at a particular time of the day (for example, 6 pm to 6 am). The hub may inform the network management element about its restrictions/requirements.

For at least some embodiments, the data profile is used to parse (filter or selectively remove or eliminate) raw data from connected data sources. Most commercially available sensors are designed for terrestrial networks and are often overly verbose (include a large amount of excess data) when transmitting data. A core function of the utilization of the data profile is to understand and map the data schema of a sensor to extract "filter" only the relevant and most important information. For example, a data report that includes "Engine RPM: 3000" may be filtered by the data profile of the data device down to "3000" which is then interpreted in the context of the data profile. That is, for an embodiment, based upon prior information "standard reporting of the specific device" of the specific data devices the data profile is selected to only transmit the selected datums which are a subset of the standard reporting. This filtering of the reported data intelligently reduces the amount of data reported which reduces the demand on the resource (for example, the wireless link) used by each data device.

As previously stated, the described embodiments of the data profiles allow for the elimination of redundant data channel setup information which is already contained inside the data profile, and is no longer needed to be shared upon the initiation of every packet sent across the network. This information may include the transmission size, sub-carrier (frequency) allocation, MCS selection, and timing information. The result of this is a reduction in data resources consumed by the network to send a packet of data.

Further, as shown for example by the data profile 720 of FIG. 7, the data profile includes the ruleset for radio resource allocation. As an example, the ruleset for selecting transmission timing may include integrating forward in time a periodic phase offset the integrated periodicity of periodic reporting. For an embodiment, the ruleset may include user defined functions and routing (for example, geo-fencing or temperature reporting).

As described, at least some embodiments include the data profile of each data device being used to dictate or change radio resource allocations and general modem operating procedures supported on an application level. For an embodiment, the data profile of a data device is used to change, update, or modify link-layer or application layer encryption schemes as a function of a location of the data device, and/or the time of day. It may be desirable for a data device to maintain a higher level of security of reported data based on the location of the data device, and/or the time of reporting of the data of the data device.

For an embodiment, the data profile of a data device is used to change, update, or modify muting or attenuation of a transmission signal power of the reported data as a function location of the data device, the time of day, and/or network loading. For at least some embodiments, rulesets of the data profile are used for directing how and when to do channel estimation of the communication channel of the wireless link between the hub of the data device and the base station. For an embodiment, the data profile of the data device controls the timing of the channel estimation based on the application of the data device. For example, a mobile fleet management application may be directed by the data (device) profile to do channel estimation more often (and/or as a function of velocity) and differently than a stationary agriculture sensor. That is, the channel of a mobile device will change more frequently than a stationary device, and the data profile of the mobile device will direct the communication channel of the mobile data device to be re-measured more frequently. For an embodiment, the rulesets of the data profiles control power management of the hub via satellite transmissions of the hub. As an example, a user case such as fishing where users charge their device every night may utilize higher MCS, less repetitions, more output power to achieve the most efficient and reliable link possible. Other applications such as long-distance trucking may utilize less spectrally efficient methods to transmit their data, but methods which are more energy efficient.

As shown in FIG. 5, at least some embodiments include adjusting the data profile for each device based at least in part on a location of the device, wherein the data profile adjustment mitigates differences in propagation time of communication propagating from each hub to the base station. Further, as described, other methods include determining the differences in propagation times based on measured propagation delays. For at least some embodiments, the data profiles for the data device include a function to calculate a timing advance based upon the location (for example, GPS location) of the data device, and a static location of the satellite the hub of the data device is wirelessly linked to the base station through. For an embodiment, this function of the data profile is updated whenever the device transits to a different satellite.

For at least some embodiment, a data profile supports multiple data devices. That is, for example, the network management element determines a data profile for multiple data devices. For an embodiment, the data profile supports multiple data devices with overlapping transmission characteristics. Through management of the data profile, utilization of the wireless link between the hub and the base station can be more efficiently used. That is, transmission overhead, such as, random access transmission, and control message overhead, can be more efficient due to the management of the data profile for multiple data devices. If for example, two different data devices have data to be transmitted within a threshold duration of time, a single data profile can be managed for the data devices. The data of the data devices can be merged. For an embodiment, the merging of the data means the data of the different data devices are transmitted from the hub to the base station using a single data blob (for example, a data packet) using a single grant message from the network management element. For an embodiment, the hub adds a proprietary wrapper/header to define data boundaries and associate data to different devices. For example, wrapper can include a data start index and a size for each data device.

For at least some embodiments, controlling the timing of the communication of the data for each of the one or more data sources from the hub to the base station through the wireless link includes selecting the timing as one of real-time communication, scheduled communication, or periodic communication based on the data profile selected for the data source. For at least some embodiments, different data sources of the hub have different data profiles that include differently controlled timing of communication of data of the different data sources from the hub to the base station. For at least some embodiments, a data profile of at least one data source of the hub controls timing of communication of data of the at least one data source according to more than one type of controlled timing based on characteristics of the data of the at least one data source.

Real-time, periodic, and scheduled transmissions are unique transmission types on the link layer. However, different data movement manifestations can occur in the context of the application layer. For an embodiment, an application layer transmission mode includes a store and forward mode. For an embodiment, the store and forward mode includes locally storing in memory one or many device datums to aggregate prior to sending the data over the network using one of the link layer mechanisms. The combination of data processing and/or routing and the selection of a link layer transmission mechanism creates an application layer transmission mechanism. For example, data from a sensor of a data device can be collected in a local buffer of the data device until the buffer reaches X capacity and then the data device (as dictated by the data profile of the data device) transmits that data immediately. This is an example of an application layer "store and forward" mechanism that is built with a real time link layer transmission combined with data storage and processing functions from the data profiles.

For an embodiment, an application layer transmission mode as defined by the data profile of a data device includes a data pull mode. For an embodiment, the data pull mode cumulatively storing live datum until requested by a user. For example, through the data profile, a data device may be directed to store the latest temperature reading and transmit that reading over the network when requested by a user via a web console through a top down route via the base station and network management element.

At least some embodiments further include updating, by the network management element, the profile of one or more of the data sources. At least some embodiments further include adaptively updating the profile by a network operation center based on data communication activity of at least the base station. For at least some embodiments, the data communication activity includes network traffic congestion. For at least some embodiments, the data communication activity includes wireless communication between the hubs and the base station, and communication between the data sources and the hubs. For at least some embodiments, the data communication activity includes a composition of data traffic between real-time traffic, scheduled traffic, and periodic traffic. For at least some embodiments, the data profile is updated based on at least one of a data load of the network, a user selection, customer acquisition, or application.

For at least some embodiments, the hub autonomously updates a data profile of a data device based on a sensed orientation of the hub of the data device. For an embodiment, the hub pushes the data profile update to the network management element. For example, when the orientation of the hub is placed upside down, this sensed orientation of the hub can be sensed, and the data profile of a data device connected to the hub can be adaptively updated to operate in a store and forward mode. For an embodiment, orientation of the hub is sensed and the data profile is updated based on the sensed orientation to affect radio transmission parameters of the wireless communication between the hub and the base station. For example, the orientation of the hub can be detected using a 9-axis IMU (accelerometer, gyroscope, magnetic sensor, all sensing 3 orientations). Based on the sensed orientation of the hub, the data profile of the data device connected to the hub is adaptively updated to dictate, for example, the MCS, repetition, and/or other radio parameters to adjust for loss of gain from antenna or other link budget factors that are affected by the orientation of the hub.

For at least some embodiments, the data profile sets a packet size of communication of data of a data source that is communicated through the wireless link. For an embodiment, the packet size is selected to help reduce overhead—and save the shared resource (wireless link). Further, for an embodiment, the selected data profile includes a selected MCS (modulation and coding scheme) based on the data source and the application being served.

For an embodiment, the packet size and/or list of datums that are transmitted over the network is updated based upon an "active/not active" flag. For an embodiment, setting the flag may come from directing sensing on the hub (for example, an IMU, GPS, temperature) or may come into the data profile directly from the sensor as a flag. Both sides of the wireless link (hub and base station) need to a priori know the packet size in order to support the wireless communication between the hub and the base station.

For at least some embodiments, the data profiles include preamble codes, and wherein for real-time communication, the preamble codes are inserted into packets of the data sources to uniquely identify the data source of the packet during real-time communication. At least some embodiments further include the network management element selecting the preamble code for the data source based on a historical analysis of real-time transmission timings of the hub of the data source and other data sources. For an embodiment, different preamble codes are allocated to data sources that historically report within a margin of time, and similar codes are allocated to data sources that historically report at disparate times. For an embodiment, different preamble codes are assigned to data devices base on a QoS (quality of service) to minimize congestion of data traffic been the base station and the hubs.

At least some embodiments further include processing, by one of more of the hubs, the data of the data source, and communicating the processed data through the wireless link to the base station. For an embodiment, the processing includes filtering the data. An embodiment includes only communicating (reporting) a type of data if a threshold condition is satisfied. For an embodiment, the processing. For an embodiment, the processing includes synthesizing data of more than one data source. For an embodiment, synthesizing includes combining the data of more than one data source before reporting. For an embodiment, synthesizing includes filtering data of one source based on values of data of a second data source.

Figure 12:
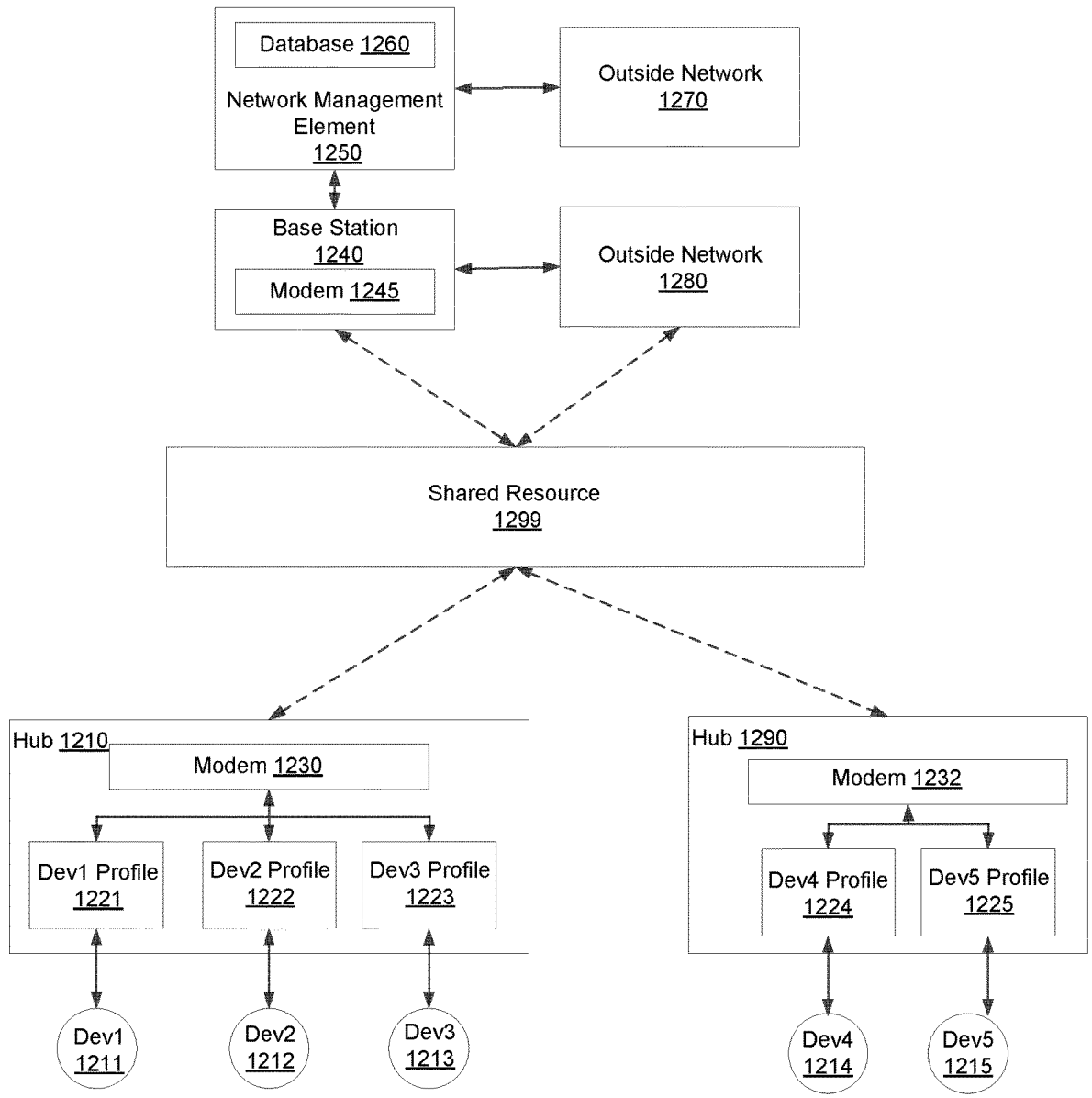
FIG. 12 shows a plurality of hubs that communicate data of data sources through a shared resource to a base station, according to an embodiment.

FIG. 12 shows a plurality of hubs 1210, 1290 that communicate data of data sources 1211, 1212, 1213, 1214, 1215 through a shared resource to a base station, according to an embodiment. As shown, the data sources 1211, 1212, 1213, 1214, 1215 are connected to the hubs 1210, 1290. The hubs 1210, 1290 communicate through modems 1230, 1232 to a modem 1245 of the base station 1240 through the wireless links. For an embodiment, the wireless links are a shared resource 1299 that has a limited capacity. The described embodiments include data profiles which are utilized to provide efficient use of the shared resource 1299. The base station may also communicate with outside networks 1270, 1280.

As previously described, it is to be understood that the data sources 1211, 1212, 1213, 1214, 1215 can vary in type, and can each require very different data reporting characteristics. The shared resource 1299 is a limited resource, and the use of this limited resource should be judicious and efficient. In order to efficiently utilize the shared resource 1299, each of the data sources 1211, 1212, 1213, 1214, 1215 are provided with data profiles 1221, 1222, 1223, 1224, 1225 that coordinate the timing (and/or frequency) of reporting (communication by the hubs 1210, 1290 to the base station 1240 through the shared resource 1299) of the data provided by the data sources 1211, 1212, 1213, 1214, 1215.

For an embodiment, a network management element 1250 maintains a database 960 in which the data profiles 1221, 1222, 1223, 1224, 1225 can be stored and maintained. Further, the network management element 1250 manages the data profiles 1221, 1222, 1223, 1224, 1225, wherein the management includes ensuring that synchronization is maintained during the data reporting by the hubs 1210, 1290 of the data of each of the data sources 1211, 1212, 1213, 1214, 1215. That is, the data reported by each hub 1210, 1290 of the data of the data sources 1211, 1212, 1213, 1214, 1215 maintains synchronization of the data reporting of each of the data sources 1211, 1212, 1213, 1214, 1215 relative to each other. Again, the network management element 1250 ensures this synchronization through management of the data profiles 1221, 1222, 1223, 1224, 1225. The synchronization between the data sources 1211, 1212, 1213, 1214, 1215 distributes the timing of the reporting of the data of each of the data sources 1211, 1212, 1213, 1214, 1215 to prevent the reporting of one device from interfering with the reporting of another device, and provides for efficiency in the data reporting.

For at least some embodiments, the network management element 1250 resides in a central network location perhaps collocated with multiple base stations and/or co-located with a network operations center (as shown, for example, in FIG. 6). For an embodiment, the network management element 1250 directly communicates with the base station 1240 and initiates the transfer of data profiles across the network via the base station 1240 to the hubs 1210, 1290.

For at least some embodiments, data profiles are distributed when new hubs are brought onto the network, when hubs change ownership, or when the hubs are re-provisioned. Other changes to data profile contents outside of these situations are more likely addressed by sync packets (for an embodiment, a sync packet is a packet to update the value of a specific field inside of a data profile, but not necessarily updating the structure of the data profile) were only small changes to profile fields are required.

As described, the data profiles 1221, 1222, 1223, 1224, 1225 control timing of when the hubs 1210, 1290 communicate the data of the data sources 1211, 1212, 1213, 1214, 1215 through the shared resource 1299. Accordingly, the described embodiments coordinate access to the shared resource 1299 to insure optimal usage of the network resource to avoid collisions between packets, the transmission of redundant information, and to reshape undesired traffic profiles.

NBIOT

Figure 13:
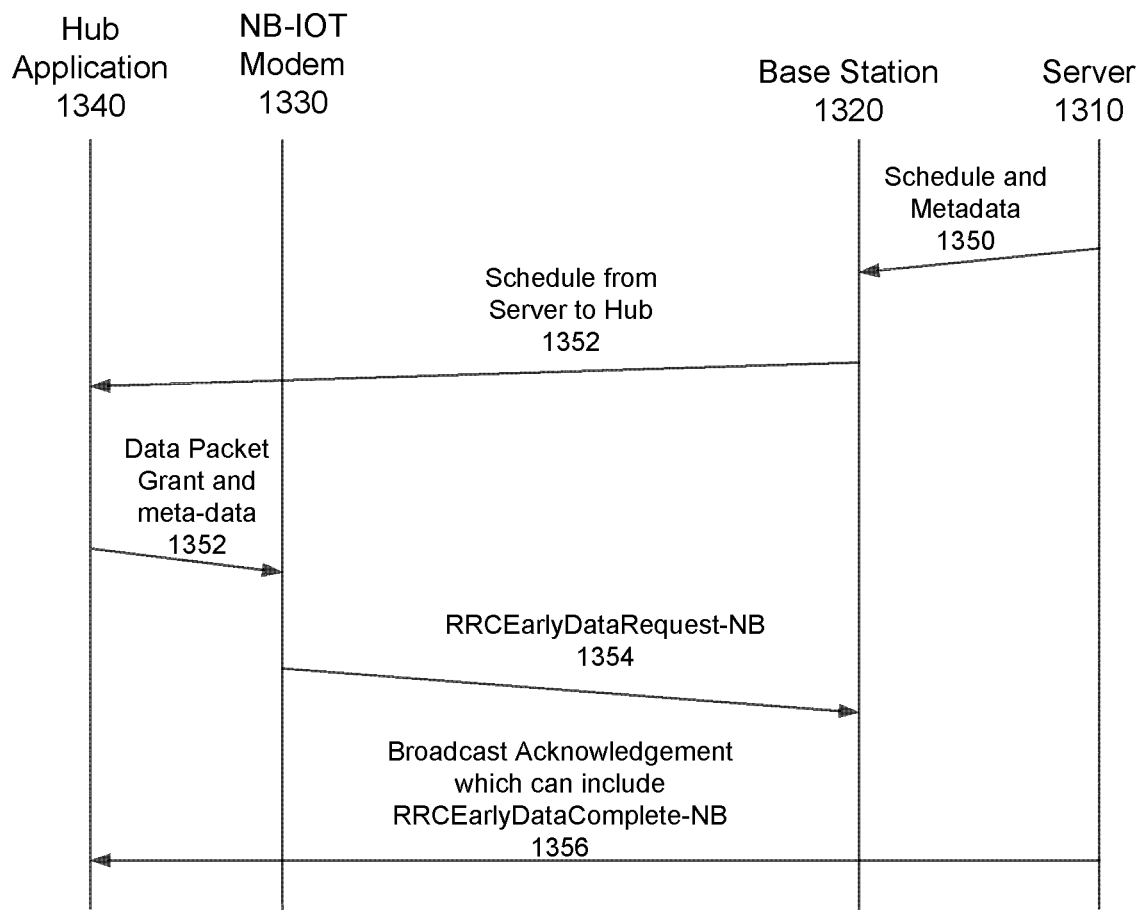
FIG. 13 shows a series of NBIOT communications between a server, a base station, a modem of a hub, and a hub, according to an embodiment.

At least some of the described embodiments can be utilized for implementations of NBIOT (Narrow Band Internet of Things). FIG. 13 shows a series of NBIOT communications between a server 1310, a base station 1320, a NBIOT (narrow-band internet of things) modem 1330 of a hub, and the hub 1340, according to an embodiment.

As previously described, for an embodiment, the server 1310 schedules communication between the base station and a plurality of hubs. For an embodiment, this includes the server providing the base station 1320 with a schedule and metadata 1350. That is, the base station 1320 receives the scheduled communication.

As previously described, for an embodiment, each hub 1340 is provided a data profile that includes a periodicity, an offset, and a carrier frequency based on the scheduled communication. For an embodiment, this includes the base station 1320 providing the schedule of the server 1310 to the hub 1340 as depicted by 1352 through a wireless link.

As previously described the base station 1320 receives uplink wireless communication from each of the plurality of hubs according to the data profile of each of the hubs and according to the scheduled communication. For an embodiment, this includes the hub 1340 providing the NBIOT modem 1330 with a data packet grant and meta-data 1352, and the NBIOT modem 1330 communicating an RRC (radio resource control) EarlyDataRequest-NB 1354 to the base station 1320 through the wireless link.

As previously described, at least some embodiments include the base station 1320 simultaneously broadcasting acknowledgements of reception of the uplink wireless communication from each of the plurality of hubs. At least one of the plurality of hubs receives and determines whether uplink wireless communication from the at least one of the plurality of hubs was successfully received based at least the periodicity, the offset, and the carrier frequency of the data profile of the at least one of the plurality of hubs. For an embodiment, this includes the server 1310 and/or base station 1320 communicating a broadcast acknowledgement 1356 that can include RRCEarlyDataComplete-NB to the hub 1340.

Specifically as related to NB-IOT, for an embodiment, the RRCEarlyDataRequest message is used by a hub (for example, user equipment (UE)) for uplink transmission. That is, the scheduled uplink transmission uses an RRCEarlyDataRequest message as specified in NB-IOT.

Further, specifically as related to NB-IOT, for an embodiment, according to an NB-IOT data-flow, the RRCEarlyDataComplete message is used to complete the data transmission operations at UE. For an exemplary data transmission mode, the simultaneously broadcasting acknowledgements are used to complete the data transmission operations at hub (or UE), and the simultaneously broadcasting acknowledgements include the RRCEarlyDataComplete message.

As previously stated, for an embodiment, the data profile includes a periodicity, an offset, and a carrier frequency based on the scheduled communication. For an embodiment, the periodicity includes a Data transmission Period in terms of H-SFN, SFN and SF. For an embodiment, the offset includes a Start Hyper system frame number (H-SFN), system frame number (SFN) and subframe number for data transmission.

For an embodiment, the data profile further includes a packet size, which for an embodiment includes a maximum TBS (transport block size) for an uplink data packet.

Further, at least some embodiments include a retransmission mechanism in case of failure. That is, the simultaneously broadcasting acknowledgements indicate failure of an uplink wireless communication. The retransmission occurs upon determining failure of the uplink wireless communication.

Although specific embodiments have been described and illustrated, the embodiments are not to be limited to the specific forms or arrangements of parts so described and illustrated. The described embodiments are to only be limited by the claims.

What is claimed:

1. A method of communicating through a wireless link, comprising:
    scheduling, by a server, communication between a base station and a plurality of hubs;
    receiving, by the base station, the scheduled communication;
    providing, to each hub, a data profile that includes a periodicity, an offset, and a carrier frequency based on the scheduled communication;
    receiving, by the base station, uplink wireless communication from each of the plurality of hubs according to the data profile of each of the hubs and according to the scheduled communication, wherein the uplink wireless communication is included within an uplink frame, wherein an uplink wireless communication allocation of each of the plurality of hubs is within a different time slot of the uplink frame than other of the plurality of hubs; and
    simultaneously broadcasting, by the base station, acknowledgements of reception of the uplink wireless communication from each of the plurality of hubs within a downlink frame; wherein
    a hub of the plurality of hubs receives the downlink frame that includes the simultaneous broadcast acknowledgements and determines whether uplink wireless communication from the hub was successfully received based on a determination of which of one or more bits within the simultaneous broadcast acknowledgements of the downlink frame includes acknowledgment information of the hub based on scheduled time and frequency slots of the scheduled communication for the uplink wireless communication of the hub.

2. The method of claim 1, wherein the uplink wireless communication is transmitted by the plurality of hubs and received by the base station through a satellite wireless link, and the base station simultaneously broadcasts the acknowledgements through the satellite wireless link.

3. The method of claim 1, further comprising:
    wherein reception of the simultaneously broadcast acknowledgements by each hub is facilitated by the data profile of the hub.

4. The method of claim 3, wherein the data profile includes at least one time and frequency slot for uplink communication of the hub.

5. The method of claim 4, wherein the data profile further includes at least one time and frequency slot for reception of broadcast acknowledgments by the hub.

6. The method of claim 1, wherein the scheduled communication that is provided to the base station includes time slots and carrier frequencies, and includes an allocation of at least some of the time slots and subcarrier frequencies.

7. The method of claim 6, further comprising, allocating, by the base station, additional time slots and carrier frequencies.

8. The method of claim 7, wherein the allocating includes receiving, by the base station, subsequent requests and demands that the base station adapts and infills the additional time slots and carrier frequencies.

9. The method of claim 1, wherein the data profile of the user device facilitates reception of the simultaneously broadcast acknowledgements through at least an acknowledgement period and an acknowledgement offset included within the data profile of the hub that allows the hub to determine when to receive simultaneously broadcast acknowledgements of uplink wireless communication of the hub.

10. The method of claim 1, wherein each simultaneously broadcast acknowledgement includes acknowledgement information of a plurality of hubs that transmitted uplink wireless communication within a corresponding period of time t2-t1, and subcarrier frequencies.

11. The method of claim 1, wherein the simultaneously broadcast acknowledgements include simultaneously multicast acknowledgements, wherein an acknowledgment for each of the user devices within the simultaneously multicast acknowledgements include a code that a corresponding set of hubs can decode.

12. The method of claim 1, wherein an acknowledgment for each of the hubs within the simultaneously broadcast acknowledgements provides an acknowledgment to the hub for uplink wireless communication within a specified number of time slots and carrier frequencies.

13. The method of claim 1, wherein the hub profile includes the periodicity, offset, and carrier frequency for the uplink wireless communication, and an acknowledgement periodicity, and an acknowledgement offset of acknowledgements of the uplink wireless communication within the simultaneously broadcast acknowledgements.

14. A wireless system, comprising:
a server, the server operative to schedule communication between a base station and a plurality of hubs through a wireless link;
the base station operative to:
receive the scheduled communication;
provide to each hub a data profile that includes a periodicity, an offset, and a carrier frequency based on the scheduled communication;
receive uplink wireless communication from each of the plurality of hubs according to the data profile of each of the hubs and according to the scheduled communication, wherein the uplink wireless communication is included within an uplink frame, wherein an uplink wireless communication allocation of each of the plurality of hubs is within a different time slot of the uplink frame than other of the plurality of hubs; and
simultaneously broadcast acknowledgements of reception of the uplink wireless communication from each of the plurality of hubs;
wherein
a hub of the plurality of hubs receives the downlink frame that includes the simultaneous broadcast acknowledgements and determines whether uplink wireless communication from the hub was successfully received based on a determination of which of one or more bits within the simultaneous broadcast acknowledgements of the downlink frame includes acknowledgment information of the hub based on scheduled time and frequency slots of the scheduled communication for the uplink wireless communication of the hub.

15. The wireless system of claim 14,
wherein reception of the simultaneously broadcast acknowledgements by each hub is facilitated by the data profile of the hub.

16. The wireless system of claim 15, wherein the data profile includes at least one time and frequency slot for uplink communication of the hub.

17. The wireless system of claim 16, wherein the data profile further includes at least one time and frequency slot for reception of broadcast acknowledgments by the hub.

18. The wireless system of claim 14, wherein the hub profile includes the periodicity, offset, and carrier frequency for the uplink wireless communication, and an acknowledgement periodicity, and an acknowledgement offset of acknowledgements of the uplink wireless communication within the simultaneously broadcast acknowledgements.

19. The method of claim 1, further comprising:
monitoring reporting times of different data sources of different hubs over time;
allocating preamble codes to each of the data sources, wherein different preamble codes are allocated to different data sources that report within a margin of time of each other; and
inserting the allocated preamble codes into packets of each of the data sources.

* * * * *